US011198803B2

(12) United States Patent
Bae et al.

(10) Patent No.: US 11,198,803 B2
(45) Date of Patent: Dec. 14, 2021

(54) AMINOBENZOATE-TERMINATED MATERIALS FOR LAMINATED ADHESIVES

(71) Applicant: Dow Global Technologies LLC, Midland, MI (US)

(72) Inventors: Woo-Sung Bae, Northville, MI (US); Justin M. Virgili, Oakland, CA (US); Mark F. Sonnenschein, Midland, MI (US); Jonathan Barrus, Lake Jackson, TX (US); Yinzhong Guo, Pearland, TX (US); Rui Xie, Pearland, TX (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 15/749,410

(22) PCT Filed: May 31, 2016

(86) PCT No.: PCT/US2016/035013
§ 371 (c)(1),
(2) Date: Jan. 31, 2018

(87) PCT Pub. No.: WO2017/023405
PCT Pub. Date: Feb. 9, 2017

(65) Prior Publication Data
US 2018/0223143 A1    Aug. 9, 2018

Related U.S. Application Data

(60) Provisional application No. 62/199,600, filed on Jul. 31, 2015.

(51) Int. Cl.
| | | |
|---|---|---|
| *C09J 175/04* | (2006.01) | |
| *B32B 7/12* | (2006.01) | |
| *C08G 18/50* | (2006.01) | |
| *C08G 18/32* | (2006.01) | |
| *B32B 7/00* | (2019.01) | |
| *B32B 27/28* | (2006.01) | |
| *B32B 27/40* | (2006.01) | |
| *C08G 18/40* | (2006.01) | |
| *C09J 175/02* | (2006.01) | |
| *C09J 175/00* | (2006.01) | |

(52) U.S. Cl.
CPC ............... *C09J 175/04* (2013.01); *B32B 7/00* (2013.01); *B32B 7/12* (2013.01); *B32B 27/28* (2013.01); *B32B 27/40* (2013.01); *C08G 18/3243* (2013.01); *C08G 18/4018* (2013.01); *C08G 18/5027* (2013.01); *C09J 175/00* (2013.01); *C09J 175/02* (2013.01); *B32B 2405/00* (2013.01)

(58) Field of Classification Search
CPC ... C09J 175/02; C09J 175/04; C08G 18/3243; C08G 18/4018; C08G 18/5027
See application file for complete search history.

(56) References Cited

U.S. PATENT DOCUMENTS

| | | | |
|---|---|---|---|
| 4,732,959 A | 3/1988 | Otani et al. | |
| 5,183,877 A | 2/1993 | Swanson | |
| 5,405,218 A | 4/1995 | Hyde-Smith | |
| 6,111,129 A | 8/2000 | Barrows et al. | |
| 6,309,507 B1* | 10/2001 | Morikawa | C08G 18/10 156/331.4 |
| 6,994,909 B2 | 2/2006 | Glasbrenner | |
| 8,500,948 B2 | 8/2013 | Kollbach et al. | |
| 9,318,074 B2 | 4/2016 | Jang et al. | |
| 2002/0091222 A1 | 7/2002 | Viegas et al. | |
| 2007/0116910 A1* | 5/2007 | Polykarpov | B32B 15/08 428/35.2 |
| 2009/0030226 A1 | 1/2009 | Wang et al. | |
| 2010/0021676 A1 | 1/2010 | Laubry | |
| 2015/0190902 A1 | 7/2015 | Woo et al. | |

FOREIGN PATENT DOCUMENTS

| | | |
|---|---|---|
| EP | 0449616 A2 | 10/1991 |
| JP | 2010077326 A | 4/2010 |
| WO | 2005097861 A1 | 10/2005 |
| WO | 2006053051 A2 | 5/2006 |
| WO | 2008019215 A1 | 2/2008 |
| WO | 2012054922 A2 | 4/2012 |
| WO | 2012142148 A1 | 10/2012 |
| WO | 2012158664 A2 | 11/2012 |

OTHER PUBLICATIONS

PCT/US2016/035013, International Search Report and Written Opinion dated Aug. 8, 2016.
PCT/US2016/035013, International Preliminary Report on Patentability dated Feb. 15, 2018.

* cited by examiner

Primary Examiner — Ramsey Zacharia

(57) ABSTRACT

A process comprising a) mixing i) an isocyanate reactive component that contains from 2 to 100 weight percent of an aminobenzoate terminated composition wherein the isocyanate reactive component does not contain a solvent; and ii) an isocyanate terminated component having an isocyanate functionality of from 2 to 6 wherein the isocyanate terminated component does not contain a solvent; at a stoichiometric ratio of NCO to reactive hydrogen in the range of from 0.9 to 2.5; to form an adhesive composition; b) applying the adhesive composition to a primary substrate; and c) laminating the primary substrate with a secondary film to form a laminate structure, is disclosed. The laminate structure can be used as a laminating adhesive.

4 Claims, No Drawings

AMINOBENZOATE-TERMINATED MATERIALS FOR LAMINATED ADHESIVES

REFERENCE TO RELATED APPLICATIONS

The present application claims the benefit of U.S. Provisional Application No. 62/199,600, filed on Jul. 31, 2015.

FIELD OF THE INVENTION

The present invention is related to adhesives, in particular flexible food packaging adhesives.

BACKGROUND

Solventless polyurethane adhesive compositions are preferred in food packaging applications as they are more economical in comparison to solvent-based and water-based adhesives. However, solventless adhesives often suffer from a wide range of performance deficiencies, namely slow bond strength development, inferior final bond strength, high initial primary aromatic amine (PAA) content and isocyanate (NCO) content, and slow PAA and NCO decay. These shortcomings have limited the application of solventless adhesives to low- and medium-performance markets. Speedy NCO decay and bond development in high-performance polyurethane packaging adhesives are particularly desirable due to the use of aliphatic isocyanates in these systems. Aliphatic isocyanates are necessary in retort and boil-in-bag applications due to the concern of PAA formation in the hot and wet environment. However, most aliphatic isocyanates have lower reactivity than aromatic isocyanates when reacting with polyols and polyamines. As a result, high-performance solventless adhesives often suffer from slow NCO decay and bond strength development.

Therefore, solventless adhesives, in particular high-performance solventless polyurethane adhesives that allow fast bond strength development and speedy PAA and NCO decay are desirable in the market.

SUMMARY OF THE INVENTION

In one broad embodiment of the present invention, there is disclosed a process comprising, consisting of, or consisting essentially of a) mixing i) an isocyanate reactive component that contains from 2 to 100 weight percent of an aminobenzoate terminated composition having a structure of

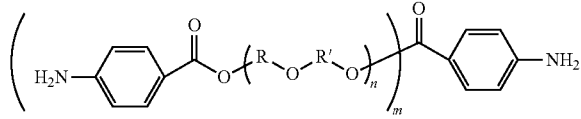

wherein R and R' are, independent of each other, linear or branched alkylene compounds having 2 to 18 carbon atoms per molecule, diol, triol or tetra alcohol initiated polyols partially or fully capped with aminobenzoates, or wherein the (—R—O—R') group is —R"OOCR"'COOR"—; wherein R" is an alkylene compound having 2 to 8 carbon atoms per molecule and R"' is an aliphatic or aromatic compound having 2 to 10 carbon atoms per molecule; wherein n is from 1 to 500; and wherein m is from 1 to 5; wherein the isocyanate reactive component does not contain a solvent; and ii) an isocyanate terminated component which does not contain a solvent; at a stoichiometric ratio of NCO to reactive hydrogen in the range of from 0.9 to 2.5; to form an adhesive composition; b) applying the adhesive composition to a primary substrate; and c) laminating the primary substrate with a secondary film to form a laminate structure.

In another embodiment of the present invention, there is disclosed the use of the above adhesive composition as a laminating adhesive.

In yet another embodiment of the present invention, there is disclosed a flexible package comprising, consisting of, or consisting essentially of the above laminate structure.

DETAILED DESCRIPTION OF THE INVENTION

One broad aspect of the present invention is a process comprising a) mixing
i) an isocyanate reactive component that contains from 2 to 100 weight percent of an aminobenzoate terminated composition having a structure of

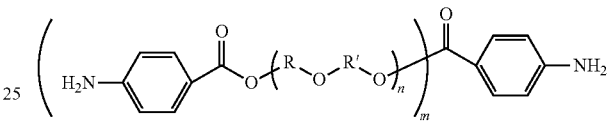

wherein R and R' are, independent of each other, selected from the group consisting of linear or branched alkylene compounds having 2 to 18 carbon atoms per molecule, diol, triol or tetra alcohol-initiated polyols partially or fully capped with aminobenzoates, or wherein the (—R—O—R') group is —R"OOCR"'—COOR"—; wherein R" is an alkylene compound having 2 to 8 carbon atoms per molecule and R"' is an aliphatic or aromatic compound having 2 to 10 carbon atoms per molecule; wherein n is from 1 to 1000; and wherein m is from 1 to 5; wherein the isocyanate reactive component does not contain a solvent; and ii) an isocyanate terminated component having an isocyanate functionality of from 2 to 6 wherein the isocyanate terminated component does not contain a solvent at a stoichiometric ratio of NCO to reactive hydrogen in the range of from 0.9 to 2.5; to form an adhesive composition; b) applying the adhesive composition to a primary substrate; and c) laminating the primary substrate with a secondary film to form a laminate structure.

In some embodiments, the aminobenzoate-terminated composition has a structure of

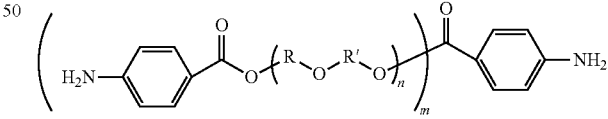

In the above structure, R and R' are, independent of each other, selected from the group consisting of linear or branched alkylene compounds having 2 to 18 carbon atoms per molecule, diol, triol or tetra alcohol initiated polyols partially or fully capped with aminobenzoates, or wherein the (—R—O—R) group is —R"OOCR"'—COOR"—; wherein R" is an alkylene compound having 2 to 8 carbon atoms per molecule and R"' is an aliphatic or aromatic compound having 2 to 10 carbon atoms per molecule. The value of n is from 1 to 1000. Any and all values between 1 and 1000 are included herein and disclosed herein; for example, n can be from 10 to 300, 10 to 150, 20 to 100, or 30 to 60. The value of m is from 1 to 5. Any and all values between 1 and 5 are included herein and disclosed herein; for example, n can be 1, 2, 3, 4, or 5.

The isocyanate reactive component does not contain a solvent.

Suitable aminobenzoate terminated compounds include but are not limited to aniline functionalized polyethylene glycols, polypropylene glycols, polybutylene oxide polyol, polytetramethylene glycols, and mixtures and/or copolymers thereof. Other suitable aminobenzoate terminated materials include aniline functionalized polyester polyols, polycaprolactone polyols, polycarbonate polyols, bio based polyols, polyacrylic polyols and mixtures and/or copolymers thereof. These aniline terminated compounds can be further blended with conventional polyether polyols, polyester polyols, diols, triols, polyamines, or mixtures of them to formulate an isocyanate reactive component.

The aminobenzoate-terminated component generally has an aminobenzoate functionality of from 1 to 20. In various embodiments, the aminobenzoate-terminated component has an aminobenzoate functionality of between 2 to 10 and has an aminobenzoate functionality of between 2 to 3 in various other embodiments.

The aminobenzoate-terminated component is generally present in the range of from 2 to 100 weight percent, based on the total weight of the isocyanate reactive composition. Any and all ranges between 2 and 100 weight percent are included and disclosed herein, for example, the aminobenzoate-terminated composition can be present in the range of 4 to 90 weight percent, 8 to 70 weight percent, or 10 to 50 weight percent in the isocyanate reactive composition.

Additionally, in various embodiments, aminobenzoate terminated compositions can be used as an additive, i.e. as an adhesion promoter or cross-linker.

This component does not contain a solvent.

In various embodiments, the isocyanate-terminated component can be a polyisocyanate. The polyisocyanate can be any aromatic, aliphatic, cycloaliphatic and/or (cyclo)aliphatic di- and/or polyisocyanate. In various other embodiments, the isocyanate terminated component is an isocyanate-based prepolymer.

Examples of aromatic di- or polyisocyanates, include but are not limited to 1,3- and 1,4-phenylene diisocyanate, 1,5-naphthylene diisocyanate, 2,6-toluene diisocyanate, 2,4-toluene diisocyanate (2,4-TDI), 2,4'-diphenylmethane diisocyanate (2,4'-MDI), 4,4'-diphenylmethane diisocyanate, mixtures of them, oligomeric diphenylmethane diisocyanates (polymeric MDI), xylylene diisocyanate, tetramethylxylylene diisocyanate and triisocyanatotoluene.

In various embodiments, aliphatic di- or polyisocyanates generally have 3 to 16 carbon atoms in the linear or branched alkylene residue, and 4 to 12 carbon atoms in various other embodiments.

In various embodiments, suitable cycloaliphatic or (cyclo)aliphatic diisocyanates generally contain in the cycloalkylene residue from 4 to 18 carbon atoms, and 6 to 15 carbon atoms, in various other embodiments. Those skilled in the art adequately understand (cyclo)aliphatic diisocyanates simultaneously to mean cyclically and aliphatically bound NCO groups, such as is, for example, the case with isophorone diisocyanate. In contrast to this, cycloaliphatic diisocyanates are understood to mean those which only have NCO groups directly bound to the cycloaliphatic ring, e.g. $H_{12}MDI$.

Examples of aliphatic isocyanates that can be used include, but are not limited to cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate.

Additional examples include, but are not limited to isophorone diisocyanate (IPDI), hexamethylene diisocyanate (HDI), diisocyanatodicyclohexylmethane ($H_{12}MDI$), 2-methylpentane diisocyanate (MPDI), 2,2,4-trimethylhexamethylene diisocyanate/2,4,4-trimethylhexamethylene diisocyanate (TMDI), and norbornane diisocyanate (NBDI), xylene diisocyanate (XDI), 1,3-Bis(1-isocyanato-1-methylethyl)benzene, 1,4-Bis(1-isocyanato-1-methylethyl)benzene, 1,4-bis (isocynatomethyl) cyclohexane (1.4-H6 XDI), and 1,5 pentamethylene diisocyanate (PDI). The isocyanurates of IPDI, HDI, XDI, TMDI and/or $H_{12}MDI$ are also usable.

Also suitable are 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate and 1,4-diisocyanato-4-methyl-pentane.

Mixtures of the above isocyanate compounds can also be used.

In various embodiments, the isocyanate terminated component can be a polyurethane prepolymer. Suitable compounds that can react with polyisocyanates to form polyurethane prepolymers include compounds with hydroxyl groups, amino groups, and thio groups. Examples of the compounds include, but are not limited to polyesters, polycaprolactones, polyethers, polyacrylates, and polycarbonates polyols with an OH number of 5 to 2000 mg KOH/gram, an average molar mass of 62 to 20,000 g/mol, and a functionality between 1.5 to 6.0, and mixtures thereof. It is preferable to use polyols with an OH number of 14 to 2000 mg KOH/gram, particularly preferably with an OH number of 28 to 1400 mg KOH/gram with functionality between 2.0 to 4.0. It is very particularly preferable to use polyols with an OH number of 38 to 800 mg KOH/gram with functionality between 2.0 to 3.0. Preference is given to polyols with an average molecular weight of 300 to 3000 g/mol, particularly preferably with an average molecular weight of 400 to 1500 g/mol having functionality between 2.0 to 3.0.

The isocyanate component is generally present in the range of from 8 to 98 weight percent, based on the total weight of the composition. Any and all ranges between 8 and 98 weight percent are included herein and disclosed herein; for example, the isocyanate component can be present in the range of 10 to 95 weight percent, 12 to 90 weight percent, 20 to 88 weight percent, 26 to 80 weight percent, 32 to 72 weight percent, 40 to 65 weight percent, and 45 to 55 weight percent.

This component also does not contain a solvent.

The adhesive composition can also contain additional components such as flow aids, leveling agents, adhesion promoters, block resistant agents, defoamers, and catalysts.

Any substrate suitable for laminating adhesives can be used. Examples include, but are not limited to high density polyethylene, low density polyethylene, linear low density polyethylene, isotactic polypropylene, cast polypropylene, polyamide, nylon, polyesters, copolyesters, metalized plastics, aluminum foils, and combinations thereof.

The adhesive composition may be applied to the primary substrate by any method known in the art such as, for example by spray coating, roller coating, or casting.

The primary substrate can be laminated with a secondary substrate by any method known in the art. In various embodiments, the secondary substrate is a film herein referred to a 'secondary film.' Laminates of film to film, film to metalized film, and film to foil can be made via hand lamination or machine lamination. Hand lamination often involves applying the adhesive to the primary substrate using a drawdown bar, and then bringing the secondary film to the contact of the primary substrate to form laminates under pressure. Machine lamination can be done via a commercial laminator, such as those available from Nordmeccanica, Comexi, and Bobst.

After the secondary film is laminated to the primary substrate, curing can begin. The adhesive composition is generally cured at a temperature in the range of from 0° C. to 60° C. Any and all ranges between 0° C. and 60° C. are included herein and disclosed herein, for example, the adhesive composition can be cured at a temperature in the range of from 10° C. to 50° C., or from 20° C. to 40° C.

The above formulated adhesives can apply to various package structures, including but not limited to laminate structures of polyester/aluminum foil, polypropylene/aluminum foil, or polyethylene/aluminum foil, polyimide/aluminum foil, nylon/aluminum foil, polyester/polyethylene, nylon/cast polypropylene, polyester/cast polypropylene, and other diplex, triplex, and multi-layer laminates of polymer film to polymer films, polymer film to metalized polymer films, and polymer film to foil. These laminate structures are useful in particular for flexible packaging for food, pharmaceutical, and industrial applications, such as window films for building construction and automobiles, flexible packaging for electronics, and photovoltaic devices.

EXAMPLES

Raw Materials Used for Adhesive Formulation

| Material name | Type | source |
| --- | --- | --- |
| Mor Free ™ 403A | Polyaromatic isocyanate | Dow |
| Mor Free ™ 117 | Polyester polyol | Dow |
| Voranol ™ 223-060 | Aminobenzoate terminated | Lab made |
| LM AT | Voranol 223-060 LM from Benzocaine | experimental material |
| Mor Free ™ C-33 | Aliphatic polyisocyanate | Dow |
| Mor Free ™ 225 | Polyester polyol | Dow |
| Versalink ® P-1000 | Aminobenzoate terminated polytetramethylene glycol | Air Products |
| Versalink ® P-650 | Aminobenzoate terminated polytetramethylene glycol | Air Products |
| Versalink ® P-250 | Aminobenzoate terminated polytetramethylene glycol | Air Products |

Preparation of the Laminate Structures

Adhesives were prepared by mixing components of the isocyanate reactive composition (Part A) first, followed by mixing the Part A with the isocyanate composition (Part B) at the desired stoichiometry ratio (NCO/OH).

Laminate structures were prepared by applying the mixture (adhesive) first to a primary substrate, and then hand laminating it with a secondary film. The laminate structures were then placed at room temperature or elevated temperature to complete the curing process.

Measurements

Potlife of the adhesives was measured by a Brookfield Viscometer at 40° C. Potlife is defined as the time it takes for the viscosity of the adhesive to reach 4500 cps. Bond strength (peel strength) of the adhesive was measured by a Thwing-Albert Tensile Tester at 10 inch/min on a 1 inch wide strip of the laminate. At least three specimens were measured. A number of failure modes were observed, where AS stands for adhesive split failure mode and bond strength is reported with the mean value; AT stands for adhesive transfer failure mode and the bond strength is reported with the mean value; FT stands for film tear failure mode and bond strength is reported with the peak value; and FS stands for film stretch failure mode and bond strength is reported with the peak value.

Retort test was conducted in a retort chamber on pouches at 3 inches by 5 inches filled with deionized water. The test conditions were 121° C. for 1 hour. After the test, bond strips were prepared and bond strength was measured at room temperature by a Thwing-Albert Tensile Tester operated at 10 inch/min.

TABLE 1

Composition and Processing Characteristics of Comparative Examples 1-2 and Examples 1-4

| | Comparative Example 1 | Comparative Example 2 | Example 1 | Example 2 | Example 3 | Example 4 |
| --- | --- | --- | --- | --- | --- | --- |
| Part A | | | | | | |
| Mor Free ™ 117 | 6.00 | | 5.50 | | | |
| Mor Free ™ 225 | | 6.00 | | 5.70 | 5.75 | 5.75 |
| Voranol ™ 223-060 | | | 1.66 | 1.35 | | |
| LM AT | | | | | | |
| Versalink ® P-1000 | | | | | 0.80 | |
| Versalink ® P-650 | | | | | | 0.55 |
| Part B | | | | | | |
| Mor Free ™ 403A | 6.00 | | 6.00 | | | |
| Mor Free ™ C-33 | | 6.00 | | 6.00 | 6.00 | 6.00 |
| NCO Index (NCO/OH) | 1.34 | 1.20 | 1.34 | 1.2 | 1.20 | 1.20 |
| Potlife, Min. | 38 | >60 | 33 | 29 | | |

TABLE 2

Composition and Processing Characteristics of Examples 5-10

| | Example 5 | Example 6 | Example 7 | Example 8 | Example 9 | Example 10 |
|---|---|---|---|---|---|---|
| Part A | | | | | | |
| Mor Free ™ C117 | | | | | | |
| Mor Free ™ 225 | 5.75 | | | 5.80 | 5.75 | 5.65 |
| Voranol ™ 223-060 | | | | | | |
| LM AT | | | | | | |
| Versalink ® P-1000 | | 17.1 | | | | |
| Versalink ® P-650 | | | 12.45 | 0.45 | 0.55 | 0.75 |
| Versalink ® P-250 | 0.30 | | | | | |
| Part B | | | | | | |
| Mor Free ™ C-33 | 6.00 | 6.00 | 6.00 | 6.00 | 6.00 | 6.00 |
| NCO Index (NCO/OH) | 1.20 | 1.20 | 1.20 | 1.20 | 1.20 | 1.20 |
| Potlife, Min. | 13.0 | ≥60 | ≥60 | Not tested | Not tested | Not tested |

Tables 1 and 2 shows composition and potlife of Comparative Examples 1-2 and Example 1-10. Use of 5 wt % to 100 wt % of an aminobenzoate terminated compound in the isocyanate reactive composition can significantly reduce potlife of the adhesive without affecting its processing characteristics. Potlife of the adhesives can be optimized to 20-30 minutes at the processing conditions via adjusting the amount of the aminobenzoate terminated compound in the isocyanate reactive composition.

TABLE 3

Bond Strength Buildup of Comparative Example 1 and Example 1 in Various Structures

| | Examples | | | | | |
|---|---|---|---|---|---|---|
| | Comparative Example 1 | | | Example 1 | | |
| | Structures | | | | | |
| Bond in g/inch & Failure Mode | OPA/ GF-19 | Prelam AL/ 808.24 | 75 SLP/ 70 SPW | OPA/ GF-19 | Prelam AL/ 808.24 | 75 SLP/ 70 SPW |
| 2 hours | 98 (AS) | 27 (AS) | 19 (AS) | 19 (AS) | 26 (AS) | 34 (AS) |
| 4 hours | 110 (AS) | 77 (AS) | 82 (AS) | 154 (AS) | 91 (AS) | 169 (AS) |
| 6 hours | 163 (AS) | 212 (AS) | 196 (AS) | 303 (AS) | 312 (AS) | 402 (AS) |
| 24 hours | 167 (AS) | 592 (AS) | 521 (FT) | 911 (FT) | 1211 (FS) | 616 (FT) |
| 96 hours | 148 (AS) | 1483 (FS) | 522 (FT) | 1076 (FT) | 1008 (FS) | 459 (FT) |
| 168 hours | 148 (AS) | 1230 (FS) | 466 (FT) | 1140 (FT) | 672 (FS) | 427 (FT) |

Bond strength development of Example 1 was much faster compared to Comparative Example 1. Within 24 hours, bond strength of Example 1 was strong enough to cause film tear or film stretch for all the laminated structures examined To the contrary, bond strength of Comparative Example 1 was weak in laminates of OPA/GF-19 and Prelam Al/808.24.

TABLE 4

Bond Strength Buildup of Comparative Example 2 and Example 2 in Various Structures

| | Examples | | | | | |
|---|---|---|---|---|---|---|
| | Comparative Example 2 | | | Example 2 | | |
| | Structures | | | | | |
| Bond in g/inch & Failure Mode | OPA/ GF-19 | Prelam AL/ 808.24 | 75 SLP/ 70 SPW | OPA/ GF-19 | Prelam AL/ 808.24 | 75 SLP/ 70 SPW |
| 1-day RT | 9.6 (AS) | 5.3 (AS) | 4.3 (AS) | 8.3 (AS) | 38.7 (AS) | 5.7 (AS) |
| 3-day RT | 42.7 (AS) | 93.7 (AS) | 102.3 (AS) | 367.0 (FT) | 211 (AS) | 309.0 (FT) |

As shown in Table 4, bond strength buildup in aliphatic isocyanate based adhesives can be accelerated by adding small amount of an aminobenzoate terminated compound. Example 2 demonstrated strong bond development at room temperature, as evident by the bond strength and failure mode (FT) in both OPA/GF-19 and 75 SLP/70 SPW laminates on day 3, superior to the bond strength of Comparative Example 2 in the same laminate structures.

TABLE 5

Bond Strength Buildup of Comparative Example 2 and Examples 3-7 in Prelam Al/CPP

| Bond in g/inch & Failure Mode | Comparative Example 2 Prelam Al/CPP | Example 3 Prelam Al/CPP | Example 4 Prelam Al/CPP | Example 5 Prelam Al/CPP | Example 6 Prelam Al/CPP | Example 7 Prelam Al/CPP |
|---|---|---|---|---|---|---|
| 1-day RT | 1.0 (AS) | 2.0 (AS) | 2.0 (AS) | 2.0 (AS) | 365.0 (AS) | 396.0 (AS) |
| 2-day RT | 6.0 (AS) | 35.0 (AS) | 19.0 (AS) | 6.9 (AS) | 397.0 (AS) | 354.0 (AS) |
| 3-day RT | 200.0 (AS) | 270.0 (AS) | 336.0 (AS) | 231.0 (AS) | | |
| 8-day RT | | | | | 209.0 (AS) | 253.0 (AS) |
| 9-day RT | 275.0 (FT) | 296.0 (FT) | 291.0 (AS) | 308.7 (AS) | | |

Table 5 shows bond strength buildup for Comparative Example 2 and Examples 3 to 7. Bond strength buildup is faster in the inventive Examples, and the speed of the bond buildup depends on the amount of the aminobenzoate terminated compound in the isocyanate reactive composition. The higher the amount of the aminobenzoate terminated compound is, the faster the bond buildup is, with speed of bond strength buildup maximized at 100% of aminobenzoate terminated compound in the isocyanate reactive composition.

TABLE 6

Bond Strength Buildup of Comparative Example 2 and Examples 8-10 in Prelam Al/CPP

| Bond in g/inch & Failure Mode | Comparative Example 2 Prelam Al/CPP | Example 8 Prelam Al/CPP | Example 9 Prelam Al/CPP | Example 10 Prelam Al/CPP |
|---|---|---|---|---|
| 1-day RT, 1-day 45° C. | 427 (AT) | 483 (AT) | 480 (AT) | 489 (AT) |
| 1-day RT, 3-day 45° C. | 621 (AT) | 661 (AT) | 659 (AT) | 630 (AT) |
| 1-day RT, 7-day 45° C. | 659 (AT) | 658 (AT) | 726 (AT) | 648 (AT) |
| DI water Retort at 121° C. for 1 hour | 412 (AT) | 507 (AT) | 480 (AT) | 481 (AT) |

Table 6 shows bond strength buildup in examples containing different level of Versalink P-650. The laminate structure was produced via a Labo Combi laminator made by Nordmeccanica. Coat weight of the resulted Prelam aluminum foil/CPP laminate was 1.0 pound/ream. The laminate structures were cured at 25° C. and 50% humidity for 24 hours followed by curing at 45° C. for up to 7 days. In general, compositions containing aminobenzoate terminated compound demonstrated improved bond strength. Especially, when the laminates were subjected to deionized water retort test at 121° C. for 1 hour, the compositions containing the aminobenzoate terminated compound showed improved heat and moisture resistance over the Comparative Example 2.

The invention claimed is:

1. A process for forming a laminate structure for a flexible packaging, the process comprising:
a) mixing
i) an isocyanate reactive component that consists of an aminobenzoate terminated composition having a structure of

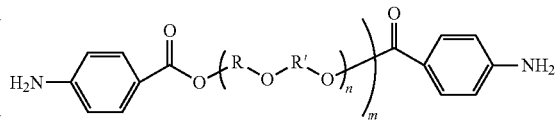

wherein R and R' are, independent of each other, selected from the group consisting of linear or branched alkylene compounds having 2 to 18 carbon atoms per molecule, diol, triol or tetra alcohol-initiated polyols partially or fully capped with aminobenzoates, or wherein the (—R—O—R') group is —R"OOCR'''COOR"—; wherein R" is an alkylene compound having 2 to 8 carbon atoms per molecule and R''' is an aliphatic or aromatic compound having 2 to 10 carbon atoms per molecule;
wherein n is from 1 to 1000; and
wherein m is from 1 to 5;
and
ii) an isocyanate terminated component having an isocyanate functionality of from 2 to 6 wherein the isocyanate terminated component does not contain a solvent, wherein the isocyanate terminated component is an aliphatic isocyanate;
at a stoichiometric ratio of NCO to reactive hydrogen in the range of from 0.9 to 2.5; to form an adhesive composition;
b) applying the adhesive composition to a primary substrate; and
c) laminating the primary substrate with a secondary film to form a laminate structure, wherein the laminate structure is polyester/aluminum foil, polypropylene/aluminum foil, polyethylene/aluminum foil, polyimide/aluminum foil, nylon/aluminum foil, polyester/polyethylene, nylon/cast polypropylene, polyester/cast polypropylene, or a diplex, triplex, or multi-layer laminate of polymer film to polymer films, polymer film to metalized polymer films, or polymer film to foil.

2. The process of claim 1 wherein the aminobenzoate-terminated composition is selected from the group consisting of aniline functionalized polyethylene glycols, aniline functionalized polypropylene glycols, aniline functionalized polybutylene oxide polyol, aniline functionalized polytetramethylene glycols, aniline functionalized poly carbonate, aniline functionalized polycaprolactone, aniline functionalized polyesters, aniline functionalized polyester-polyether copolymers, and mixtures and/or copolymers thereof.

3. The process of claim 1 wherein the isocyanate-terminated component comprises a polyurethane prepolymer.

4. A flexible package comprising the laminate structure of claim 1.

\* \* \* \* \*